Jan. 22, 1963  A. J. SALKIND  3,075,033
STORAGE BATTERY ELECTRODES AND METHODS FOR MAKING THEM
Filed July 8, 1959
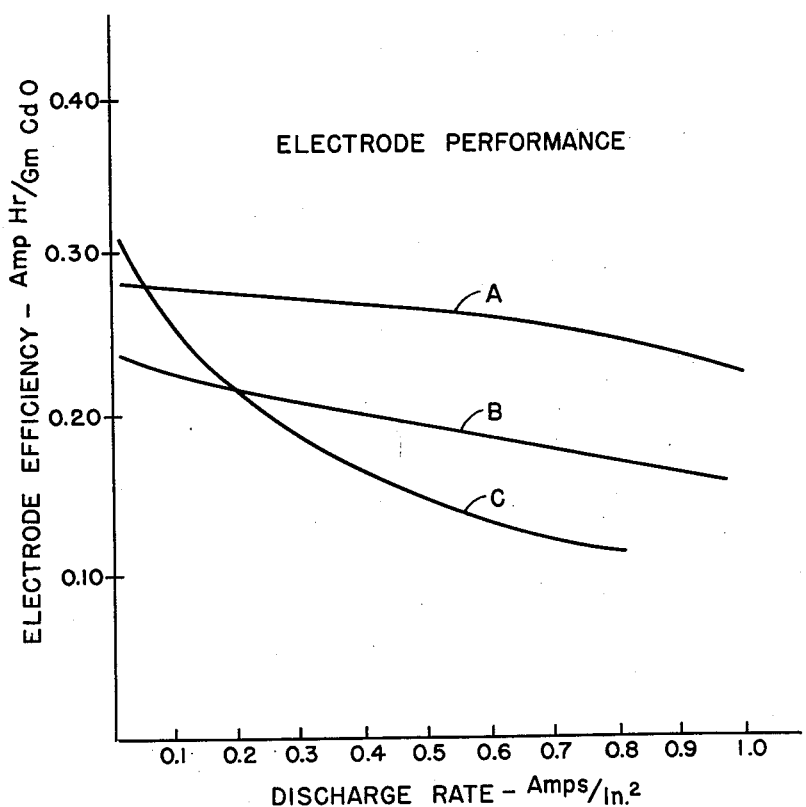
INVENTOR.
ALVIN J. SALKIND
BY
ATTORNEY 3,075,033
STORAGE BATTERY ELECTRODES AND
METHODS FOR MAKING THEM
Alvin J. Salkind, Trenton, N.J., assignor to The Electric
Storage Battery Company, a corporation of New Jersey
Filed June 8, 1959, Ser. No. 818,639
4 Claims. (Cl. 136—24)

The present invention relates to battery electrodes and to methods for producing them. More specifically, the present invention is concerned with new and improved additives to electrode active materials which not only produce electrodes of increased efficiency but in addition, facilitate electrode manufacture.

Though not limited thereto, the present invention is particularly adapted for use in electrodes of the type in which the electrochemically active material is bound in a porous matrix of a thermoplastic material, such as polyethylene. In the co-pending applications, Serial No. 818,638 and Serial No. 818,766, of J. C. Duddy, filed on even date herewith, and assigned to the assignee of this invention, there is described a new and improved method for making such electrodes. Specifically, in these applications, there is disclosed a method of making battery electrodes in which a first thermoplastic resin, insoluble in a given solvent, is intimately mixed under heat and pressure with a second thermoplastic resin, incompatible with the first thermoplastic resin and soluble in the given solvent, to produce a plasticized mass, the intimate mixing being accomplished on a rubber mill or in an intensive or Banbury type mixer. As disclosed in these copending applications the second thermoplastic resin is utilized in a ratio based on parts by weight of said first thermoplastic resin of between 1 to 3 and 3 to 1. After the plasticization and admixing of the thermoplastic resins has been completed, there is added to the plasticized mass, the electrode active material in powdered form for the particular type of electrode being manufactured. As specifically disclosed in application, Serial No. 818,638, if the electrode material is one having low conductivity in its electrochemically active form, graphite is intimately mixed with the active material to improve its conductivity.

After a time interval adequate for the thorough and intimate mixing of the powdered electrode material or the electrode material and graphite with thermoplastic resins, the mixture is removed from the mill. The mixture may then be shaped as by calendering or extrusion to produce material having dimensional characteristics suitable for battery application. For flat plate type electrodes, the mixture may be calendered to produce sheet material. The sheet material either before or after being cut into the desired shape for a battery electrode may be pressed into a battery grid structure and from the assembly thus produced, battery electrodes may be severed or cut by means of pattern forming dies to produce electrodes of any size or shape. After the cutting operation, the soluble resin may be leached from the electrodes by means of a bath in a suitable solvent, leaving the active material bound in a porous matrix of the insoluble thermoplastic material.

In the method of electrode production disclosed in the aforementioned applications, the soluble thermoplastic resin, by virtue of its thermoplasticity and its resinous nature, provides the extra strength for electrode handleability during manufacture and upon its removal at the completion of manufacture, by virtue of its solubility, the porosity required for the efficient utilization of the electrode active material. Electrodes produced in this manner can be distinguished from the prior art electrodes by reason of a microporosity which has heretofore been unobtainable in resin bound electrodes. The multiplicity of small pores produced by removal of the soluble resin phase have been found to be thread-like in nature and have diameters which on the average are substantially less than one micron in size. As a result of the extremely small nature of these pores and the resiliency of the permanent resin binder, the electrodes disclosed in said aforementioned applications swell upon the removal of the soluble resin phase due to the force exerted on the pore walls by the surface tension of the leaching solvent. This swelling further increases electrode porosity and hence provides for an even higher electrode efficiency in terms of the utilization of the active material.

In the milling step of the manufacturing process just described, the powdered active material and the thermoplastic resins form a banded mass on one of the rollers of the mill. It has been found that as the loading of the plasticized resins with active material is increased, it becomes more difficult to retain the banded mass on the mill and to progressively remove it therefrom upon the completion of the mixing operation. This is one of the chief factors which limits the loading of the plasticized resins with active material.

Accordingly, it is a specific object of the present invention to provide a means of increasing the loading of plasticized thermoplastic resins with finely powdered active material and to facilitate the removal of a banded mass of the loaded material from the mill.

Another object of the present invention is to provide a means for increasing electrode efficiency and for making electrode capacity more independent of the rate at which the electrode is discharged.

Since the porosity of electrodes of the type described is due in part to the expansive force exerted upon the matrix of resin and active material by the surface tension of the leaching solvent, it is a further object of the present invention to provide means for controlling the extent of pore enlargement which results from this phenomenon.

In accordance with the present invention, there is added to the mixture of plasticized resins and finely divided active material, while the mixture is still on the mill, a compound selected from the group known as metallic soaps, preferably those metallic soaps which are of a solid nature. These compounds are long chain polar molecules and may be of the saturated or unsaturated variety. My specific preference for metallic soaps are the stearates, oleates or palmitates of metals compatible with the active material of the electrode being manufactured and compatible with the system in which the electrode is to be used. By compatible with the system in which the electrode is to be used is meant that the metallic soap is not soluble in the electrolyte in which the electrode is to be used and inert with respect to the thermoplastic resin of the electrode as well as the active material of the electrode. It also should be electrically conductive. It has been found that the particular metallic soap utilized should be added to the mixture of plasticized resins and active material in an amount ranging from about 0.25% to 15% by weight of the active material utilized.

The addition of a metallic soap in the amounts indicated above to the plasticized resins and active material on the mill has been found to facilitate the loading of the plasticized resins with increased amounts of active material and also facilitates the removal of a banded mass of the material from the mill upon which it is worked. In so doing, it is believed that the metallic soap is functioning as a lubricant, internally lubricating the mixture and the interface between the mixture and the mill. In addition to facilitating the manufacture of electrodes in this manner, it has been found that the presence of metallic soap in the finished electrodes substantially increases the efficiency of such electrodes. It also has been found that it tends to make electrode performance more independent of the rate at which it is discharged. While the mechanism which makes this increase in electrode efficiency possible is not completely understood, it is believed that metallic soaps act as wetting agents, facilitating the penetration of electrolyte into the pores of an electrode. In addition, it is believed that since the metallic ion of the compound is compatible with the active material of the electrode and that since the long chain polar soap ion of the compound is compatible with the resin binder, it becomes oriented in the electrode matrix, in such a manner that it increases the conductivity of the matrix.

It has also been found that since metallic soaps are wetting agents, their presence in electrodes of the type disclosed in the aforementioned applications of J. C. Duddy tends to reduce the surface tension of the solvent utilized to remove the soluble resin phase of such electrodes. Accordingly, since porosity in such electrodes is due in part to the force exerted upon the electrode matrix by the surface tension of the leaching solvent, it is possible to control the extent of such pore enlargement by properly proportioning the amount of the metallic soap added to a particular electrode.

A better understanding of the present invention may be had from the following description of specific embodiments thereof when read with reference to the accompanying drawing which is a graph illustrating the improved performance achieved with electrodes made in accordance with the present invention.

In carrying out one form of the present invention, 12.5 grams of polyethylene, such as that available on the market from the Du Pont Co. under the trade name "Alathon 14" and 37.5 grams of polyethylene oxide, such as that available on the market under the trade name "Polyox," manufactured by the Union Carbide Chemical Co., are worked under heat and pressure to produce a plasticized mass. The intimate mixing of the two resins is accomplished at a temperature of about 220° F. to about 250° F. in a rubber mill. After the plasticization and admixture of the thermoplastic resins has been completed, there is added to the plasticized mass, 350 grams of cadmium oxide and 4 grams of nickel stearate.

After a time interval adequate for the thorough and intimate mixing of the nickel stearate, cadmium oxide and the thermoplastic resins, the mixture is removed from the mill preparatory to a calendering process. Those skilled in the art will know how to select the time required for plasticizing the thermoplastic resins and also the time required to produce the intimate admixing described above. For polyethylene resin and polyethylene oxide resin, a time on the order of 2 to 4 minutes will be satisfactory, with the mixing operation continued for a period of from 4 to 10 minutes.

When the mixture of the thermoplastic resins and the active material is removed from the mixing mill, it is fed into a sheeting device comprising a pair of calendering rolls operated at an elevated temperature, as for example, from about 220° F. to about 250° F. The calendering rolls may be set to produce sheets of any desired thickness, for example, as thin as 2 mils and upward.

The sheet material produced by the milling and calendering operation may then be pressed into a suitable grid such as a sheet of expanded nickel. Preferably, the electrode assembly process is carried out utilizing two sheets of material elevated in temperature to about between 220° F. to about 250° F. by appropriate heat means to soften the thermoplastic thereof. The two sheets are then pressed between platens together with the electrode grid and pressed into opposite sides thereof, the mating surfaces of the two sheets being bonded together within the interstices of the expanded metal grid.

From the assembly produced by the pressing operation, battery electrodes may be severed or cut by means of pattern forming or blanking dies to produce electrodes of any size or shape. After the cutting operation, the water soluble polyethylene oxide may be leached from the electrodes by means of soaking them in a water bath for a period of from about ½ hour to about 4 hours. The cadmium electrode thus produced is then ready for formation.

While the present invention has been described in connection with electrodes utilizing polyethylene as the permanent resin binder and polyethylene oxide as the soluble thermoplastic binder, it should be understood that it is applicable for use with electrodes using other types of thermoplastic resins as binders as is specified in the aforementioned application, Serial No. 818,766. By way of specific example, the following are some of the resins which may be utilized as permanent binder material: polyethylene, polypropylene, polystyrene, and polyvinyl chloride. The following water soluble thermoplastic resins are extremely advantageous from the economic point of view for use as the temporary soluble thermoplastic binder: polyethylene oxide, polyethylene glycol and polyvinyl pyrrolidone. It should be understood, however, that it is not necessary that the soluble thermoplastic resin utilized as the temporary binder and pore forming agent be water soluble. Care should be taken, however, in choosing the solvent which is to be utilized for removing the temporary resin phase since it should not be one which will react adversely with the active material of the electrode or the electrode grid structure if any is employed. In this respect, water soluble resins are also desirable because when water is used as the solvent, no adverse reaction has been found to occur.

Referring now to the drawing, there is shown the results of comparison tests made between an electrode made as described above, electrode A, a similar electrode without the addition of a metallic soap, electrode B, and a conventional cadmium electrode comprising a sintered nickel plaque impregnated with cadmium active material, electrode C. The electrodes A and B both comprised a single sheet of resin bound material pressed into an expanded nickel grid. The electrode A, however, contained approximately 1% nickel stearate by weight of the cadmium oxide present. The grids utilized in each electrode weighed approximately one gram and each electrode weighed approximately 3.8 grams. Both were formed in a 31% solution of potassium hydroxide against dummy nickel electrodes for 4 hours. Following formation, they were both cycled 3 or 4 times to develop full electrode capacity. As shown, the efficiency of a sintered cadmium electrode falls off rapidly as the discharge rate of the electrode is increased. The resin bound electrodes A and B, on the other hand, lose very little efficiency as the discharge rate is increased with the performance of electrode A, the electrode containing a metallic soap showing better performance in this respect than electrode B, a similar electrode but one lacking a metallic soap.

From these curves, it can be seen that the addition of a metallic soap in the amount of approximately 1% of the weight of the cadmium oxide increases the efficiency of the electrode by approximately 15%. It should also be noted when considering the efficiencies of the various electrodes as shown in the curves, that the electrodes A and B, the resin bound electrodes, were approximately ⅔ the weight of the sintered electrode and accordingly, their efficiencies based on electrode weight as opposed to the weight of active material in the electrode are substantially better with respect to the conventional electrode than is indicated by the curves.

While the present invention has been illustrated in connection with a cadmium electrode, it should be understood that the teachings of the present invention are applicable to other types of electrodes. In the example given hereinbefore, a metallic soap of nickel was utilized in a cadmium electrode. Since nickel is an extremely inert metal, a metallic soap of nickel will be suitable for use in many other types of electrodes. For a cadmium electrode, a metallic soap of cadmium, such as cadmium stearate, cadmium oleate, or cadmium palmitate may also be used. In selecting the particular metallic soap to be utilized, it should be noted that the metallic ion of the soap should be compatible with the active material of the electrodes and also compatible with the electrode system with which it is used. By compatible, it is meant that it should be non-injurious to the system. For example, it may not be desirable to utilize a metallic soap of copper in an alkaline system having cellulosic members because of the possible deleterious effects of the copper on such members. Similarly, it may not be desirable to utilize metallic soaps of antimony in a lead system because the presence of antimony might tend to promote self-discharge. By way of other examples of metallic soap additives suitable for use in specific electrodes, a metallic soap of zinc, such as zinc stearate, zinc oleate, or zinc palmitate, would be suitable for use in a zinc electrode. For nickel electrodes, obviously a metallic soap of nickel may be utilized and for lead electrodes, a metallic soap of lead may be utilized and so on.

Still further, it has been found that the percentage of the meallic soap added to an electrode may vary within the range of about 0.25% to 15% of active material present. With regard to the upper limit just specified, it should be noted that addition of metallic soaps beyond this percentage would not be feasible since benefit derived from the presence of the metallic soap is more than offset by the displacement of active material which could otherwise be accommodated in the electrode matrix. It has been found, however, that optimum performance can be obtained when the metallic soap is present in amounts of about 0.25% to about 1% by weight of the active material.

Having now described the invention, that which is claimed as new is:

1. A method of producing electrodes which comprises intimately and homogeneously mixing a plasticized first thermoplastic resin, a plasticized second thermoplastic resin in a ratio based upon parts by weight of said first thermoplastic resin of between 1 to 3 and 3 to 1, a battery active material in powdered form and from 0.25% to about 15% by weight of said active material of metallic soap selected from the group consisting of the stearate, oleate and palmitate of a metal insoluble in the electrolyte in which the electrode is to be used and inert with respect to said thermoplastic resins and said active material, to produce a plasticized mass in which said battery active material and said metallic soap are dispersed in a continuous phase, said second thermoplastic resin being substantially insoluble in said first thermoplastic resin, shaping said mass to produce an electrode, and subjecting said electrode to a solvent in which said first thermoplastic resin and said battery active material are substantially insoluble and inert and said second thermoplastic resin is soluble to substantially remove said second thermoplastic resin from said electrode to leave said electrode porous.

2. A battery electrode according to the method of claim 1.

3. A method of producing electrodes which comprises intimately and homogeneously mixing under heat and pressure one part by weight of polyethylene, polyethylene oxide in a ratio based upon parts by weight of said polyethylene of between 1 to 3 and 3 to 1, cadmium oxide in powdered form, and from 0.25% to about 15% by weight of said cadmium oxide of a metallic soap selected from the group consisting of the stearate, oleate and palmitate of a metal selected from the group consisting of nickel and cadmium, to produce a plasticized mass in which said cadmium oxide is dispersed in a continuous phase, said mixing being carried out at a temperature sufficient to plasticize said polyethylene and said polyethylene oxide and insufficient to substantially degrade said polyethylene, said polyethylene oxide, said cadmium oxide and said metallic soap, shaping said mass to produce an electrode and subjecting said electrode to a solvent in which said polyethylene, said cadmium oxide, and said metallic soap are substantially insoluble and inert and said polyethylene oxide is soluble to substantially remove said polyethylene oxide from said electrode to leave said electrode porous.

4. A battery electrode according to the method of claim 3.

References Cited in the file of this patent

UNITED STATES PATENTS

| 2,738,375 | Schlotter | Mar. 13, 1956 |
| 2,758,984 | Coler | Aug. 14, 1956 |
| 2,787,602 | Groves | Apr. 2, 1957 |
| 2,792,302 | Mott | May 14, 1957 |
| 2,850,555 | Pucher | Sept. 2, 1958 |
| 2,888,436 | Pritchard | May 26, 1959 |
| 2,889,308 | Fedderson | June 2, 1959 |